United States Patent
Li et al.

(10) Patent No.: US 11,348,590 B2
(45) Date of Patent: May 31, 2022

(54) METHODS AND DEVICES FOR REGISTERING VOICEPRINT AND FOR AUTHENTICATING VOICEPRINT

(71) Applicant: BAIDU ONLINE NETWORK TECHNOLOGY (BEIJING) CO., LTD., Beijing (CN)

(72) Inventors: Chao Li, Beijing (CN); Bengu Wu, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 147 days.

(21) Appl. No.: 16/094,859

(22) PCT Filed: Aug. 24, 2016

(86) PCT No.: PCT/CN2016/096479
§ 371 (c)(1),
(2) Date: Oct. 18, 2018

(87) PCT Pub. No.: WO2017/206375
PCT Pub. Date: Dec. 7, 2017

(65) Prior Publication Data
US 2019/0122669 A1 Apr. 25, 2019

(30) Foreign Application Priority Data
Jun. 1, 2016 (CN) .......................... 201610384014.7

(51) Int. Cl.
*G10L 17/06* (2013.01)
*G10L 17/04* (2013.01)
(Continued)

(52) U.S. Cl.
CPC .............. *G10L 17/06* (2013.01); *G10L 17/04* (2013.01); *H04L 9/3231* (2013.01); *G10L 17/02* (2013.01)

(58) Field of Classification Search
None
See application file for complete search history.

(56) References Cited

U.S. PATENT DOCUMENTS 6,161,090 A * 12/2000 Kanevsky ............... G10L 17/22
704/275
8,843,369 B1 * 9/2014 Sharifi .................... G10L 25/03
704/235
(Continued)

FOREIGN PATENT DOCUMENTS

| CN | 101197131 A | 6/2008 |
| CN | 104821934 A | 8/2015 |
| CN | 105096121 A | 11/2015 |

OTHER PUBLICATIONS

Lei et al. "A novel scheme for speaker recognition using a phonetically-aware deep neural network." 2014 IEEE International Conference on Acoustics, Speech and Signal Processing (ICASSP). IEEE, 2014. (Year: 2014).*

(Continued)

*Primary Examiner* — Seong-Ah A Shin
(74) *Attorney, Agent, or Firm* — Lathrop GPM LLP

(57) ABSTRACT

The present disclosure provides methods and devices for registering a voiceprint and authenticating a voiceprint. The method for registering a voiceprint includes performing a frame alignment operation on a registration character string inputted by a user in voice to extract first acoustic features of each first character constituting the registration character string; calculating a first posterior probability of the first acoustic features of each first character in a global Gaussian Mixture Model (GMM) model to perform a Baum-Welch (Continued)

(BW) statistic; extracting first vector features of each first character through a preset vector feature extractor configured for multi-character; and stitching the first vector features of each first character sequentially, to obtain a registration voiceprint model of the user.

15 Claims, 4 Drawing Sheets

(51) Int. Cl.
*H04L 9/32* (2006.01)
*G10L 17/02* (2013.01)

(56) References Cited

U.S. PATENT DOCUMENTS

| | | | |
|---|---|---|---|
| 10,347,244 B2* | 7/2019 | Goel | G10L 15/26 |
| 2005/0021335 A1* | 1/2005 | Chaudhari | G10L 15/065 |
| | | | 704/E15.009 |
| 2005/0033573 A1* | 2/2005 | Hong | G10L 15/063 |
| | | | 704/250 |
| 2006/0178887 A1* | 8/2006 | Webber | G10L 15/144 |
| | | | 704/E15.029 |
| 2009/0187405 A1* | 7/2009 | Bhogal | G10L 17/00 |
| | | | 704/246 |
| 2009/0228272 A1* | 9/2009 | Herbig | G10L 25/78 |
| | | | 381/94.1 |
| 2010/0017209 A1* | 1/2010 | Yu | G10L 17/06 |
| | | | 704/E17.003 |
| 2010/0106503 A1* | 4/2010 | Farrell | G10L 17/04 |
| | | | 704/E17.001 |
| 2012/0281885 A1* | 11/2012 | Syrdal | G06V 40/171 |
| | | | 382/116 |
| 2013/0225128 A1* | 8/2013 | Gomar | H04W 12/06 |
| | | | 455/411 |
| 2013/0238334 A1* | 9/2013 | Ma | G10L 17/04 |
| | | | 704/244 |
| 2015/0112684 A1* | 4/2015 | Scheffer | G10L 17/14 |
| | | | 704/257 |
| 2015/0161516 A1* | 6/2015 | Ghassemzadeh | G06N 5/04 |
| | | | 706/12 |
| 2015/0279374 A1* | 10/2015 | Roblek | G10L 17/24 |
| | | | 704/246 |
| 2016/0217792 A1* | 7/2016 | Gorodetski | G10L 17/04 |
| 2016/0307574 A1* | 10/2016 | Roblek | G10L 15/02 |
| 2016/0379644 A1* | 12/2016 | Li | G06F 21/32 |
| | | | 704/273 |
| 2017/0069327 A1* | 3/2017 | Heigold | G10L 17/18 |
| 2018/0254036 A1* | 9/2018 | Li | G10L 15/30 |
| 2018/0308492 A1* | 10/2018 | Roblek | G10L 15/02 |
| 2021/0075787 A1* | 3/2021 | Zhang | G10L 25/24 |

OTHER PUBLICATIONS

PCT/CN2016/096479 English translation of International Search Report dated Feb. 16, 2017, 2 pages.
PCT/CN2016/096479 International Search Report and Written Opinion dated Feb. 16, 2017, 11 pages.
Chinese Patent Application No. 201610384014.7, English translation of Office Action dated Jul. 3, 2018, 9 pages.
Chinese Patent Application No. 201610384014.7, Office Action dated Jul. 3, 2018, 7 pages.

* cited by examiner

METHODS AND DEVICES FOR REGISTERING VOICEPRINT AND FOR AUTHENTICATING VOICEPRINT

CROSS REFERENCE TO RELATED APPLICATION

This application claims priority to Chinese Patent Application No. 201610384014.7, filed with the State Intellectual Property Office of P. R. China on Jun. 1, 2016, by BAIDU ONLINE NETWORK TECHNOLOGY (BEIJING) CO., LTD. and titled with "Voiceprint Registration and Authentication methods and devices".

TECHNICAL FIELD

The present disclosure relates to the field of voice processing technologies, and more particular to method and device for registering a voiceprint, and method and device for authenticating a voiceprint.

BACKGROUND

At present, there are more and more login systems for login authentication through voiceprint as a password. Specifically, the system may prompt a certain length of character string when registering, and the user needs to read the character string out for several times to complete the registration. When logging in, the system may prompt the systemic character string, and the user reads the character string out for one time. When the voiceprints are verified to be consistent with each other, it is determined that the user is himself/herself, and the voiceprint authentication is successful. Otherwise, the voiceprint authentication is unsuccessful.

SUMMARY

The method for registering a voiceprint according to embodiments of the present disclosure includes: performing a frame alignment operation on a registration character string inputted by a user in voice to extract first acoustic features of each first character constituting the registration character string; calculating a posterior probability of the first acoustic features of each first character in a global Gaussian Mixture Model (GMM) model to perform a Baum-Welch (BW) statistic; extracting first vector features of each first character through a preset vector feature extractor configured for multi-character; and stitching the first vector features of each first character sequentially, to obtain a registration voiceprint model of the user.

The method for authenticating a voiceprint according to embodiments of the present disclosure includes performing a frame alignment operation on an authentication character string inputted by a user in voice, to extract third acoustic features of each third character constituting the authentication character string; calculating a third posterior probability of the third acoustic features of each third character in a global GMM model, to perform a BW statistic; extracting second vector features of each third character through a preset vector feature extractor configured for multi-character; stitching the second vector features of each third character sequentially, to obtain an authentication voiceprint model of the user; and matching a pre-stored registration voiceprint model of the user with the authentication voiceprint model, to determine whether the user is legal according to a matching result.

The device for authenticating a voiceprint according to embodiments of the present disclosure includes one or more processors, a memory and one or more programs. The one or more programs are stored in the memory. When the one or more programs are executed by the one or more processors, the following are executed: performing a frame alignment operation on an authentication character string inputted by a user in voice, to extract third acoustic features of each third character constituting the authentication character string; calculating a third posterior probability of the third acoustic features of each third character in a global GMM model to perform a BW statistic; extracting second vector features of each third character through a preset vector feature extractor configured for multi-character; stitching the second vector features of each third character sequentially, to obtain an authentication voiceprint model of the user; and matching a pre-stored registration voiceprint model of the user with the authentication voiceprint model, to determine whether the user is legal according to a matching result.

BRIEF DESCRIPTION OF THE DRAWINGS

The above and additional aspects and advantages of embodiments of the present disclosure will become apparent and more readily appreciated from the following descriptions made with reference to the drawings, in which.

DETAILED DESCRIPTION

Figure 1:
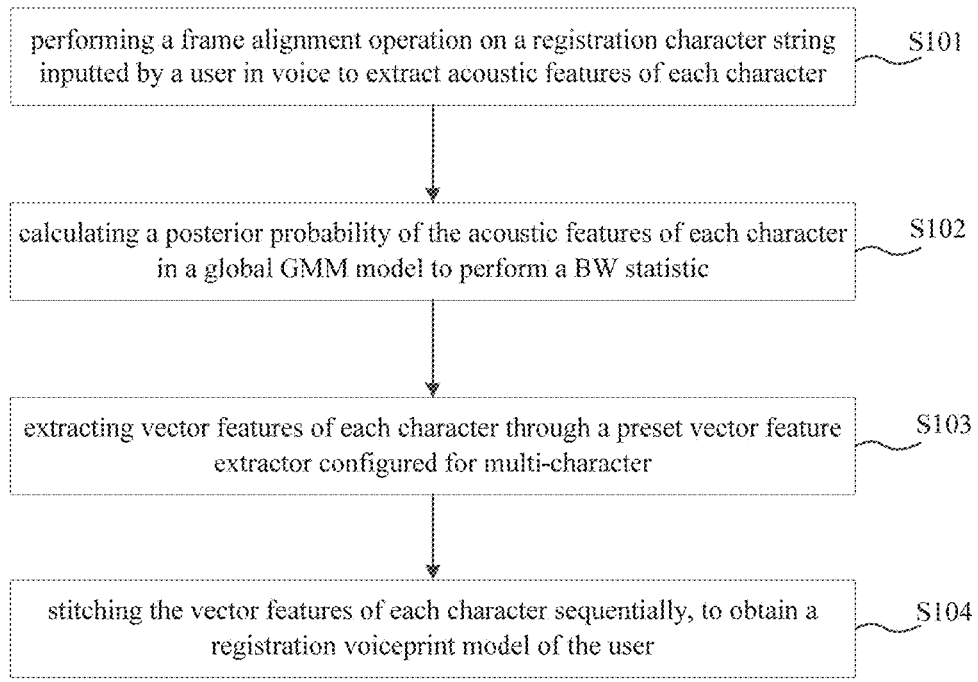
FIG. 1 is a flow chart illustrating a method for registering a voiceprint according to an embodiment of the present disclosure.

Descriptions will be made in detail to embodiments of the present disclosure. Examples of embodiments described are illustrated in drawings. The same or similar elements and the elements having same or similar functions are denoted by like reference numerals throughout the descriptions. The embodiments described herein with reference to drawings are explanatory, and used to explain the present disclosure and are not construed to limit the present disclosure.

When a registration voiceprint model is established, if there is a large amount of noise or there are some pauses during usage, an accuracy of the voiceprint registration model may be affected, and performance of the voiceprint system may be significantly reduced.

Therefore, embodiments of the present disclosure provide a method for registering a voiceprint, a method for authenticating a voiceprint, a device for registering a voiceprint and a device for authenticating a voiceprint.

The method for registering a voiceprint, the method for authenticating a voiceprint, the device for registering a voiceprint and the device for authenticating a voiceprint will be described with reference to drawings.

FIG. 1 is a flow chart illustrating a method for registering a voiceprint according to an embodiment of the present disclosure.

As illustrated in FIG. 1, the method for registering a voiceprint according to embodiments of the present disclosure includes the following.

In block 101, a frame alignment operation is performed on a registration character string inputted by a user in voice, to execute acoustic features of each character.

Specifically, when a user logs in a website or a login system of a device by inputting a voiceprint via the user as a password, a voiceprint registration is required. In order to avoid interferences to a registration scenario and generate an accurate voiceprint model, a method for registering a voiceprint is provided, such that an accurate voiceprint model may be obtained.

The frame alignment operation is performed on the registration character string inputted by the user in voice to execute the acoustic features of each character. It is to be illustrated that, there are various registration character strings, for example including textual character strings and/or numeral character strings. That is, when the user reads out, as the input, a character string "logging in Baidu Wallet", a numeral character string "567765" or a character string "logging in 567", the frame alignment operation is performed by a voice recognition model, each frame corresponding to a single word or a single number. That is, the word "logging" corresponds to a single frame, or the number "5" corresponds to a single frame.

The acoustic features may be selected according to practical requirements. For example, the acoustic features may be a Mel Frequency Cepstral Coefficients (MFCC) feature of each character voice extracted, or may be a Perceptual Linear Predictive (PLP) feature of each character voice, or may be a Linear Prediction Cepstrum Coefficient (LPCC) feature. It is to be noted that, the acoustic feature may be a combination of the above two or all features.

In block 102, a posteriori probability of the acoustic features of each character is calculated in a global Gaussian Mixture Model (GMM) model to perform a Baum-Welch (BW) statistic.

In block 103, vector features of each character are extracted through a preset vector feature extractor configured for multi-character.

Specifically, the acoustic features corresponding to each registration character string are acquired and the acoustic features of each character are inputted to the global GMM model to calculate the posteriori probability to perform the BW statistic. Further, the vector features of each character are extracted through the preset vector feature extractor configured for multi-character.

Figure 2:
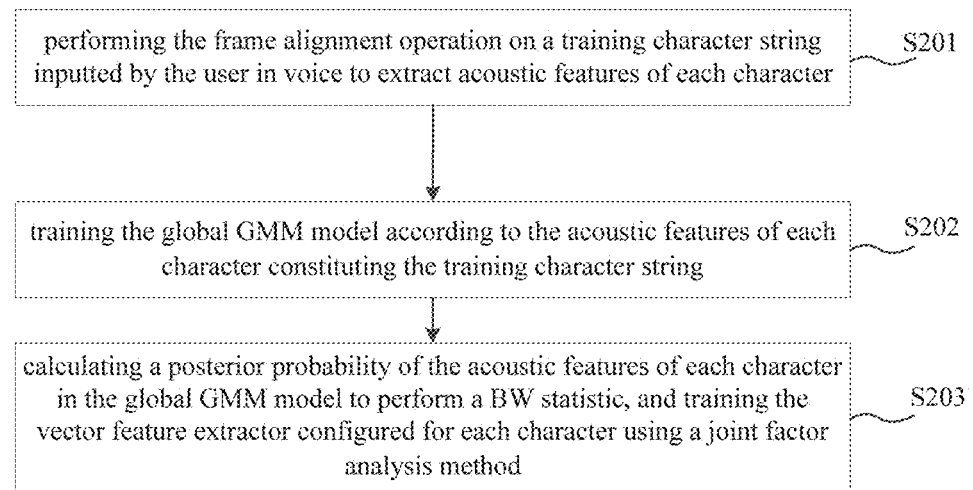
FIG. 2 is a flow chart illustrating an offline training stage according to an embodiment the present disclosure.

In order to describe clearly an establishing process of the above global GMM model and the preset vector feature extractor configured for multi-character, embodiments are illustrated with reference to FIG. 2.

In block 201, the frame alignment operation is performed on a training character string inputted by the user in voice and acoustic features of each character are extracted.

In block 202, the global GMM model is trained according to the acoustic feature of all characters constituting the training character string.

In block 203, the posteriori probability of the acoustic features of each character is calculated in the global GMM model to perform the BW statistic. The vector feature extractor configured for each character is trained using a joint factor analysis method.

Specifically, the acoustic features corresponding to each training character string are acquired in advance. The global GMM model is trained according to the acoustic features of each character as a Universal Background Model (UBM). The posteriori probability of the acoustic features of each character is calculated in the global GMM model to perform the BW statistic. The vector feature extractor of each character is trained using the joint factor analysis method.

It is to be illustrated that, there are various training character strings, for example including textual character strings and/or numeral character strings. The acoustic features of all training character strings are trained in a single global GMM model. Characters are not distinguished from each other for all training character strings. For example, taking "567765" as an example, the acoustic features of all six characters are trained in one global GMM model.

In addition, the model is not limited to the Universal Background Model (UBM) based on the global GMM model, and may be a Hidden Markov Model (HMM), a Support Vector Machine (SVM), or the like.

For example, when the training character string inputted by the user in voice is "登录百度钱包 (the Chinese words means logging in Baidu Wallet)", the BW statistic is performed on the acoustic features of each character (登, 录, 百, 度, 钱, 包) contained in the voice information of the inputted training character string in the Gaussian Mixture Model (GMM) model, such that a BM statistical value of each character ("登", "录", "百", "度", "钱", "包") constituting the training character string may be obtained. The vector features of the voice corresponding to each character ("登", "录", "百", "度", "钱", "包") may be trained using the joint factor analysis method, to further obtain the preset vector feature extractor configured for each character constituting the training character string "登录百度钱包".

The acoustic features (for example, MFCC) of each frame corresponding to a same text label are performed with the Baum-Welch statistic under a condition of the Universal Background Model (UBM) to calculate the posterior probability. The posterior probability conforms to a Gaussian distribution, and an expectation of the posterior probability is the vector feature (identity-vector, ivector).

It is to be noted that, when the Baum-Welch statistic is performed, it is word-distinguished. The posterior probability of the acoustic features of each frame corresponding to a same textual label or numeral label is executed in the Gaussian Mixture Model (GMM) model. For example, for the character string "567765", the posterior probabilities of the acoustic features of each frame corresponding to a same number "5", a same number "6" or a same number "7" are calculated in the GMM model.

In block 104, the vector features of all characters are stitched sequentially to obtain a registration voiceprint model of the user.

Therefore, the registration voiceprint model of the user may be obtained by sequentially stitching the vector features of each character constituting the registration character string extracted according to the preset vector feature extractor configured for multi-character.

For example, when all characters are numbers, the numbers may be stitched according to an order of 0123456789, to obtain the registration voiceprint model of the user.

In order to understand clearly the method for registering a voiceprint according to embodiments of the present disclosure, the method for registering a voiceprint may be described with reference to FIG. 3.

Figure 3:
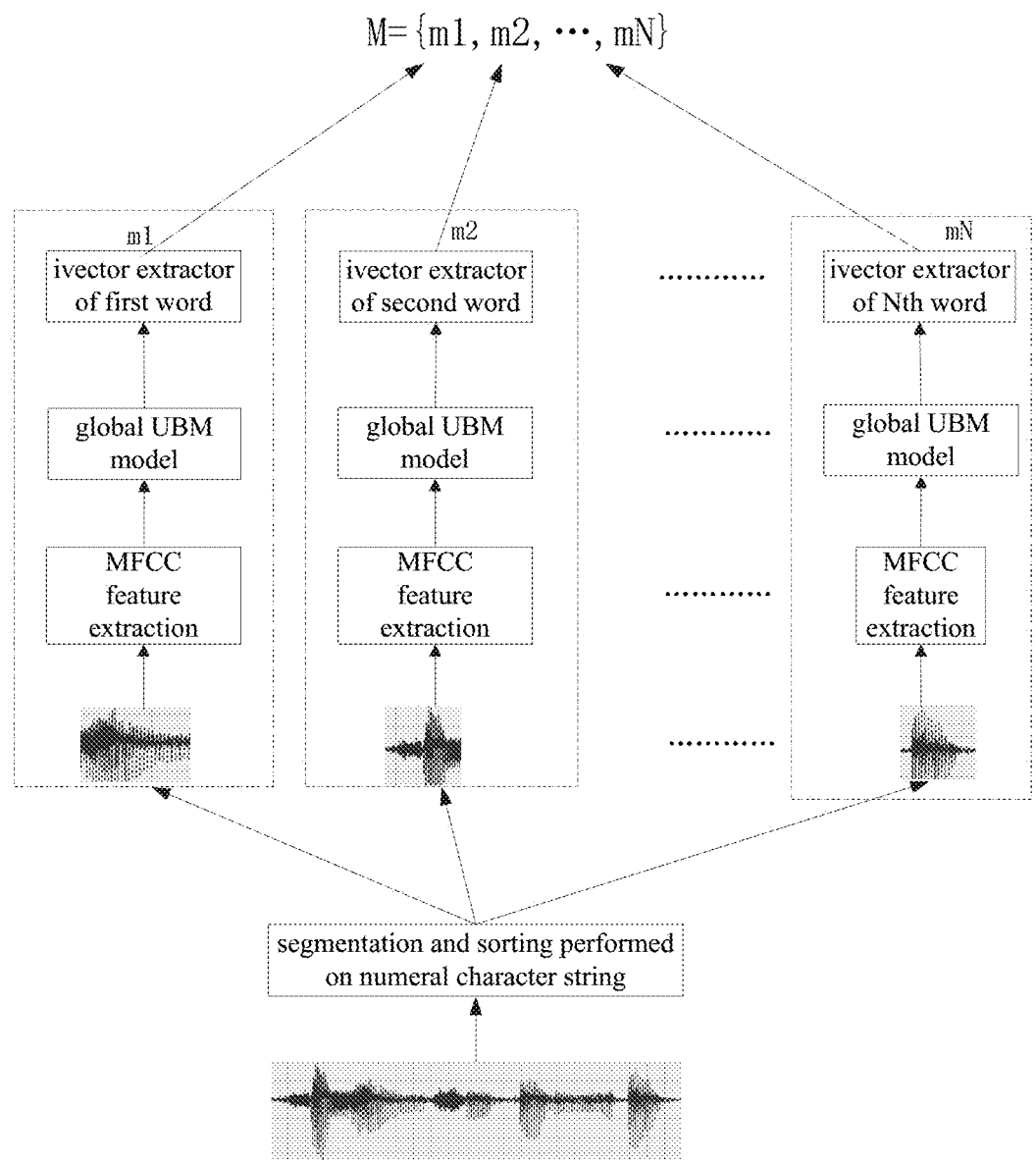
FIG. 3 is a flow chart illustrating a method for registering a voiceprint according to a specific embodiment of the present disclosure.

Taking m1 illustrated in FIG. 3 as an example for detailed description.

Voice information of a piece of registration character string inputted by the user is acquired. The registration character string is segmented and sorted. The frame alignment operation is performed on the voice information of each character constituting the registration character string (each frame corresponding to a specific word or a specific number), and an extraction operation is performed to obtain the acoustic features MFCC of the user. The Baum-Welch statistic is performed by training global GMM model according to the acoustic features of each character as the global Universal Background Model (UBM). The vector features of each character are extracted respectively using the preset vector feature extractor of characters.

Same with the process that the vector features of the characters are obtained performed on m1 in the above descriptions, the vector features of the characters 1 to N may be obtained, and may be stitched sequentially, such that the registration voiceprint model M={m1, m2, . . . , mN} of the user is obtained. That is, a correspondence between user information and voiceprints is established and stored. The voice registration of the user is finished.

In conclusion, with the method for registering a voiceprint according to embodiments of the present disclosure, the acoustic features of each character are extracted. The BW statistic is performed on the acoustic features of each character. The vector features of each character are extracted according to the preset vector extractor configured for each character and are stitched sequentially to obtain the registration voiceprint model of the user. The method may perform a feature process on each character constituting the registration character string respectively, thereby improving an accuracy of the voiceprint registration model.

Figure 4:
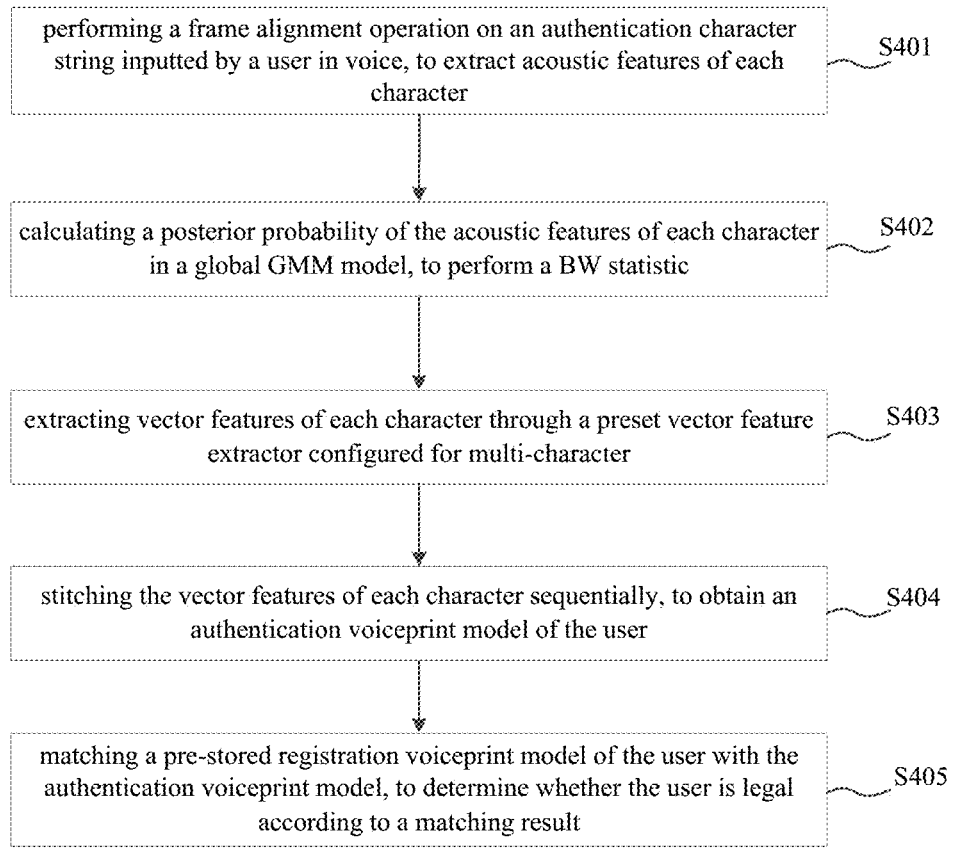
FIG. 4 is a flow chart illustrating a method for authenticating a voiceprint according to an embodiment of the present disclosure.

FIG. 4 is a flow chart illustrating a method for authenticating a voiceprint according to an embodiment of the present disclosure.

As illustrated in FIG. 4, the method for authenticating a voiceprint according to embodiments of the present disclosure may include the following.

In block 401, a frame alignment operation is performed on an authentication character string inputted by a user in voice, to extract acoustic features of each character.

In block 402, a posterior probability of acoustic features of each character is calculated in a global GMM model and a BW statistic is performed.

In block 403, vector features of each character are extracted using a preset vector feature extractor configured for multi-character.

In block 404, the vector features of each character are stitched sequentially to obtain an authentication voiceprint model of the user.

In block 405, the authentication voiceprint model is matched with a pre-stored registered authentication voiceprint of the user, and it is determined whether the user is legal according to a matched result.

Specifically, the frame alignment operation is performed on the authentication character string inputted by the user in voice to extract the acoustic features of each character. It is to be illustrated that, there are various authentication character strings, for example including textual character strings and/or numeral character strings.

For example, a login character string is textual. The user generally reads out the character string using one sentence. For example, the login character string may be "登录百 度钱包 (the Chinese sentence means logging in Baidu Wallet)". That is, in the voice information inputted by the user, a piece of voice may correspond to a character string "登录 百度钱包". Taking the piece of voice as an example for illustration, in embodiments of the present disclosure, the method for authenticating a voiceprint may be implemented as follows.

For example, a piece of voice "登录百度钱包" inputted by the user is acquired. A segmentation operation and a sorting operation are performed. The frame alignment operation is performed on the voice information of each character included in the piece of voice "登录 百度钱包" inputted by the user (each frame corresponding to "登", "录", "百", "度", "钱", "包" respectively). An extraction operation is performed to obtain the acoustic features MFCC of the user. The Baum-Welch statistic is performed under a condition of a global Universal Background Model (UBM). The vector features of each character are extracted using a preset vector feature extractor configured for each character. The vector features of all characters are stitched sequentially, to obtain the authentication voiceprint model of the user. The authentication voiceprint model is compared with registration voiceprint model to determine whether the voiceprint is matched, thereby determining whether the user is legal.

Specifically, matching the two voiceprint models is to compare the authentication voiceprint model generated during a login process with the registration voiceprint model generated during a registration process to obtain a score. When a matching degree between the registration voiceprint model and the authentication voiceprint model is greater than or equal to a predetermined threshold, it may be determined that the user is legal and the authentication is successful. That is, it is allowed to be accessed by the user. When the matching degree between the registration voiceprint model and the authentication voiceprint model is less than the predetermined threshold, it may be determined that the user is illegal, and the authentication is unsuccessful. That is, it is not allowed to be accessed by the user.

The above may be realized using a cosine distance method, a support vector machine (SWM), a Bayes classifier, or a Gaussian probability linear determination analysis method.

In conclusion, with the method for authenticating a voiceprint according to embodiments of the present disclosure, the acoustic features of each character are extracted. The BW statistic is performed on the acoustic features of each character. The vector features of each character are extracted according to the preset vector extractor configured for each character and are stitched sequentially to obtain the authentication voiceprint model of the user. The authentication voiceprint model is matched to the registration voiceprint model to determine whether the user is legal. The method may improve system performances and shorten time required by the voiceprint authentication, thereby further improving user experience when using a voiceprint login service.

The method for registering a voiceprint and the method for authenticating a voice print according to embodiments of the present disclosure may be applied to software or webpage that needs to be logged in of a terminal device, such as for logging in a phone APP, such as Baidu APP, Baidu Post Bar APP, Baidu Wallet, or the like. The terminal device has various types and may be a personal computer, a phone, or a multimedia television.

Figure 5:
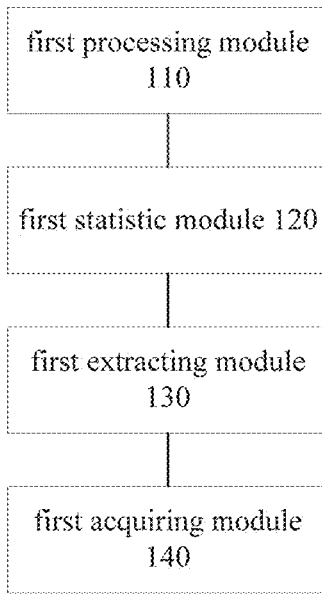
FIG. 5 is a block diagram illustrating a device for registering a voiceprint according to embodiments of the present disclosure.

In order to implement the above embodiments, embodiments of the present disclosure further provide a device for registering a voiceprint. FIG. 5 is a block diagram illustrating a device for registering a voiceprint according to an embodiment of the present disclosure. As illustrated in FIG. 5, the device for registering a voiceprint includes a first processing module 110, a first statistic module 120, a first extracting module 130 and a first acquiring module 140.

The first processing module 110 is configured to perform a frame alignment operation on a registration character string inputted by a user in voice to extract acoustic features of each character.

Specifically, the first processing module 110 is configured to perform the frame alignment operation on the registration character string inputted by the user in voice to extract the acoustic features of each character. It is to be explained that, there are various character strings, for example including textual character strings and/or numeral character strings. That is, when the user reads out, as the input, a character string "logging in Baidu Wallet", a numeral character string "567765" or a character string "logging in 567", the frame alignment operation is performed by a voice recognition model, each frame corresponding to a single word or a single number. That is, the word "logging" corresponds to a single frame, or the number "5" corresponds to a single frame.

The acoustic features may be selected according to practical requirements. For example, the acoustic features may be a Mel Frequency Cepstral Coefficients (MFCC) feature of each character voice extracted, or may be a Perceptual Linear Predictive (PLP) feature of each character voice, or may be a Linear Prediction Cepstrum Coefficient (LPCC) feature. It is to be noted that, the acoustic feature may be a combination of the above two or all features.

The first statistic module 120 is configured to calculate a posterior probability of the acoustic features of each character in a global GMM model to perform a BW statistic.

The first extracting module 130 is configured to extract vector features of each character through a preset vector feature extractor configured for multi-character.

Specifically, the acoustic features corresponding to each registration character string are acquired and the acoustic features of each character are inputted to the global GMM model to calculate the posteriori probability to perform the BW (Baum-Welch) statistic. Further, the vector features of each character are extracted through the preset vector feature extractor configured for multi-character.

Figure 6:
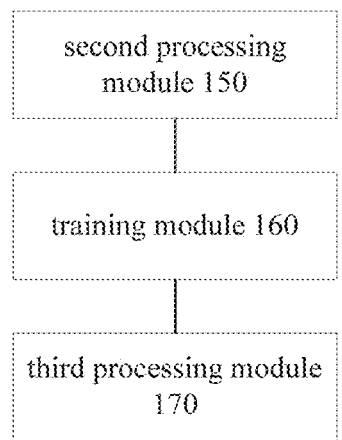
FIG. 6 is a block diagram illustrating an offline training stage according to a specific embodiment of the present disclosure.

In order to describe clearly an establishing process of the above global GMM model and the preset vector feature extractor configured for multi-character, embodiments are illustrated with reference to FIG. 6.

A second processing module 150 is configured to perform the frame alignment operation on a training character string inputted by the user in voice to extract acoustic features of each character.

A training module 160 is configured to train the global GMM model according to the acoustic features of each character constituting the training character string.

A third processing module 170 is configured to calculate a posterior probability of the acoustic features of each character in the global GMM model to perform a BW statistic and to train the vector feature extractor configured for each character using a joint factor analysis method.

It is to be explained that, the establishing process of the global GMM model and the vector feature extractor configured for multi-character are described in above embodiments related to the method for registering a voiceprint, which is not elaborated herein.

The first acquiring module 140 is configured to stitch the vector features of each character sequentially, to obtain a registration voiceprint model of the user.

Therefore, the vector features of each character constituting the registration character string extracted using the preset vector feature extractor configured for multi-character are stitched sequentially to obtain the registration voiceprint model of the user.

It is to be explained that, the descriptions and illustrations made in embodiments related to the method for registering a voiceprint may be applicable to embodiments related to the device for registering a voiceprint, and implementation principles are similar, which are not elaborated herein.

With the device for registering a voiceprint according to embodiments of the present disclosure, the acoustic features of each character are extracted via the first processing module. The BW statistic is performed the acoustic features of each character via the first statistic module. After the vector features of each character are extracted using the preset vector feature extractor configured to each character via the first extracting module, the vector features of all characters are stitched sequentially via the first acquiring module to acquire the registration voiceprint model of the user. The device performs a feature process on each character constituting the registration character string, thereby improving an accuracy of the registration voiceprint model.

Figure 7:
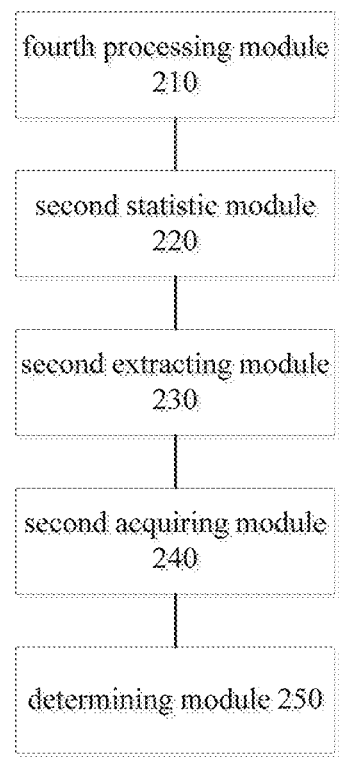
FIG. 7 is a block diagram illustrating a device for authenticating a voiceprint according to an embodiment of the present disclosure.

FIG. 7 is a block diagram illustrating a device for authenticating a voiceprint according to an embodiment of the present disclosure.

FIG. 7 is a block diagram illustrating a device for authenticating a voiceprint according to an embodiment of the present disclosure. As illustrated in FIG. 7, the device for authenticating a voiceprint includes a fourth processing module 210, a second statistic module 220, a second extracting module 230, a second acquiring module 240 and a determining module 250.

The fourth processing module 210 is configured to perform a frame alignment operation on an authentication character string inputted by a user in voice, to extract acoustic features of each character.

The second statistic module 220 is configured to calculate a posterior probability of the acoustic features of each character in a global GMM model to perform a BW statistic.

The second extracting module 230 is configured to extract vector features of each character through a preset vector feature extractor configured for multi-character.

The second acquiring module 240 is configured to stitch the vector features of each character sequentially, to obtain an authentication voiceprint model of the user.

The determining module 250 is configured to match a pre-stored registration voiceprint model of the user with the authentication voiceprint model, to determine whether the user is legal according to a matching result.

Specifically, the frame alignment operation is performed on the authentication character string inputted by the user in voice to extract the acoustic features of each character. It is to be illustrated that, there are various authentication character strings, for example including textual character strings and/or numeral character strings.

Further, matching the two voiceprint models is to compare the authentication voiceprint model generated during a login process with the registration voiceprint model generated during a registration process to obtain a score. When a matching degree between the registration voiceprint model and the authentication voiceprint model is greater than or equal to a predetermined threshold, it may be determined that the user is legal and the authentication is successful. It is allowed to be accessed by the user. When the matching degree between the registration voiceprint model and the authentication voiceprint model is less than the predetermined threshold, it may be determined that the user is illegal, and the authentication is unsuccessful. It is not allowed to be accessed by the user.

It is to be explained that, the descriptions and illustrations made to the above embodiments related to the method for authenticating a voiceprint is also applicable to embodiments related to the device for authenticating a voiceprint, and implementation principles thereof are similar, which is not elaborated herein.

With the device for authenticating a voiceprint according to embodiments of the present disclosure, the acoustic features of each character are extracted via the fourth processing module. The BW statistic is performed on the acoustic features of each character via the second statistic module. The vector features of each character are extracted using the preset vector feature extractor configured for each character via the second extracting module. The vector features of all characters are stitched sequentially via the second acquiring module to acquire the authentication voiceprint model of the user. The authentication voiceprint model is matched to the registration voiceprint model to determine whether the user is legal. The device improves system performance and reduces time required by the voiceprint authentication, thereby further improving user experience when using a voiceprint login service.

In the description of the present disclosure, it should be understood that, terms such as "first" and "second" are used herein for purposes of description and are not intended to indicate or imply relative importance or significance or indicate or imply the number of technical features. Furthermore, the feature defined with "first" and "second" may explicitly or implicitly comprise one or more this feature. In the description of the present disclosure, "a plurality of" refers to at least two, such as two, three etc., unless specified otherwise.

In the description of the present disclosure, reference terms such as "an embodiment," "some embodiments," "example," "a specific example," or "some examples," means that a particular feature, structure, material, or characteristic described in connection with the embodiment or example is included in at least one embodiment or example of the present disclosure. In the specification, the terms mentioned above are not necessarily referring to the same embodiment or example of the present disclosure. Furthermore, the particular features, structures, materials, or characteristics may be combined in any suitable manner in one or more embodiments or examples. Besides, any different embodiments and examples and any different characteristics of embodiments and examples may be combined by those skilled in the art without contradiction.

Although explanatory embodiments have been illustrated and described, it would be appreciated by those skilled in the art that the above embodiments are exemplary and cannot be construed to limit the present disclosure, and changes, modifications, alternatives and varieties can be made in the embodiments by those skilled in the art without departing from scope of the present disclosure.

What is claimed is:

1. A method for registering a voiceprint, comprising:
performing a frame alignment operation on each first character contained in a registration character string inputted by a user in voice to extract first acoustic features of each first character constituting the registration character string, wherein each frame corresponds to a first character;
calculating a first posterior probability of the first acoustic features of each first character in a global Gaussian Mixture Model (GMM) model to perform a Baum-Welch (BW) statistic;
extracting first vector features of each first character through vector feature extractors configured for each character, wherein the first vector feature of each first character is an expected value of the first posterior probability, wherein each first vector feature corresponds to a respective vector feature extractor configured for each character, and the vector feature extractors of the first characters are trained, through a joint factor analysis method, by training the global GMM model based on all acoustic features of characters of textural training character strings and numeral training character strings, calculating second posterior probabilities of second acoustic features of second characters contained in a training character string and performing the BW statistic in the trained global GMM model; and
stitching expected values of the first posterior probabilities of the first characters sequentially, to obtain a registration voiceprint model of the user.

2. The method according to claim 1, wherein the registration character string comprises:
one or more textual character strings, and/or one or more numeral character strings.

3. The method according to claim 1, wherein the first acoustic feature is a Mel Frequency Cepstral Coefficient (MFCC), a Perceptual Linear Predictive (PLP), or a Linear Prediction Cepstrum Coefficient (LPCC).

4. The method according to claim 1, wherein the first posterior probability conforms to a Gaussian distribution and the expectations of the first posterior probability are the first vector features.

5. The method according to claim 1, wherein the training character string comprises:
one or more textual character strings and/or one or more numeral character strings.

6. A method for authenticating a voiceprint, comprising:
performing a frame alignment operation on each third character contained in an authentication character string inputted by a user in voice, to extract third acoustic features of each third character constituting the authentication character string, wherein each frame corresponds to a third character;
calculating a third posterior probability of the third acoustic features of each third character in a global Gaussian Mixture Model (GMM) model, to perform a Baum-Welch (BW) statistic;
extracting second vector features of each third character through vector feature extractors configured for each character, wherein the second vector feature of each third character is an expected value of the third posterior probability, wherein each first vector feature corresponds to a respective vector feature extractor configured for each character, and the vector feature extractors of the first characters are trained, through a joint factor analysis method, by training the global GMM model based on all acoustic features of characters of textural training character strings and numeral training character strings, calculating second posterior probabilities of second acoustic features of second characters contained in a training character string and performing the BW statistic in the trained global GMM model;

stitching the expected values of the third posterior probabilities of the third characters sequentially, to obtain an authentication voiceprint model of the user; and matching a pre-stored registration voiceprint model of the user with the authentication voiceprint model, to determine whether the user is legal according to a matching result.

7. The method according to claim 6, wherein matching the pre-stored registration voiceprint model of the user with the authentication voiceprint model, to determine whether the user is legal according to the matching result comprises:

when a matching degree between the registration voiceprint model and the authentication voiceprint model is greater than or equal to a predetermined threshold, determining that the user is legal; and when the matching degree between the registration voiceprint model and the authentication voiceprint model is less than the predetermined threshold, determining that the user is illegal.

8. The method according to claim 6, wherein the registration voiceprint model is obtained by act of:

performing a frame alignment operation on a registration character string inputted by a user in voice to extract first acoustic features of each first character constituting the registration character string;

calculating a first posterior probability of the first acoustic features of each first character in a global GMM model to perform a BW statistic;

extracting first vector features of each first character through a preset vector feature extractor configured for multi-character; and stitching the first vector features of each first character sequentially, to obtain a registration voiceprint model of the user.

9. The method according to claim 8, wherein the registration character string comprises:

one or more textual character strings, and/or one or more numeral character strings.

10. The method according to claim 8, wherein first acoustic feature is a Mel Frequency Cepstral Coefficient (MFCC), a Perceptual Linear Predictive (PLP), or a Linear Prediction Cepstrum Coefficient (LPCC).

11. An apparatus for authenticating a voiceprint, comprising:

one or more processors;

a memory;

one or more programs, stored in the memory, wherein when the one or more programs are executed by the one or more processors, a method for authenticating a voiceprint is executed, the method comprises:

performing a frame alignment operation on each first character contained in an authentication character string inputted by a user in voice, to extract third acoustic features of each third character constituting the authentication character string, wherein each frame corresponds to a first character;

calculating a third posterior probability of the third acoustic features of each third character in a global Gaussian Mixture Model (GMM) model to perform a Baum-Welch (BW) statistic;

extracting second vector features of each third character through vector feature extractors configured for each character, wherein the second vector feature of each third character is an expected value of the third posterior probability, wherein each first vector feature corresponds to a respective vector feature extractor configured for each character, and the vector feature extractors of the first characters are trained, through a joint factor analysis method, by training the global GMM model based on all acoustic features of characters of textural training character strings and numeral training character strings, calculating second posterior probabilities of second acoustic features of second characters contained in a training character string and performing the BW statistic in the trained global GMM model;

stitching the expected values of the third posterior probabilities of the third characters sequentially, to obtain an authentication voiceprint model of the user; and matching a pre-stored registration voiceprint model of the user with the authentication voiceprint model, to determine whether the user is legal according to a matching result.

12. The apparatus according to claim 11, wherein matching the pre-stored registration voiceprint model of the user with the authentication voiceprint model, to determine whether the user is legal according to the matching result comprises:

when a matching degree between the registration voiceprint model and the authentication voiceprint model is greater than or equal to a predetermined threshold, determining that the user is legal; and when the matching degree between the registration voiceprint model and the authentication voiceprint model is less than the predetermined threshold, determining that the user is illegal.

13. The apparatus according to claim 11, wherein the registration voiceprint model is obtained by act of:

performing a frame alignment operation on a registration character string inputted by a user in voice to extract first acoustic features of each first character constituting the registration character string;

calculating a first posterior probability of the first acoustic features of each first character in a global GMM model to perform a BW statistic;

extracting first vector features of each first character through a preset vector feature extractor configured for multi-character; and stitching the first vector features of each first character sequentially, to obtain a registration voiceprint model of the user.

14. The apparatus according to claim 13, wherein the registration character string comprises:

one or more textual character strings, and/or one or more numeral character strings.

15. The apparatus according to claim 13, wherein first acoustic feature is a Mel Frequency Cepstral Coefficient (MFCC), a Perceptual Linear Predictive (PLP), or a Linear Prediction Cepstrum Coefficient (LPCC).

* * * * *